United States Patent
Lee

(10) Patent No.: US 11,422,895 B2
(45) Date of Patent: *Aug. 23, 2022

(54) MEMORY SYSTEM AND OPERATING METHOD THEREOF

(71) Applicant: SK hynix Inc., Gyeonggi-do (KR)

(72) Inventor: Jong-Min Lee, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/152,113

(22) Filed: Jan. 19, 2021

(65) Prior Publication Data
US 2021/0182148 A1    Jun. 17, 2021

Related U.S. Application Data

(63) Continuation of application No. 16/043,683, filed on Jul. 24, 2018, now Pat. No. 10,949,305.

(30) Foreign Application Priority Data

Dec. 19, 2017    (KR) .......................... 10-2017-0174906

(51) Int. Cl.
| | |
|---|---|
| *G06F 11/00* | (2006.01) |
| *G06F 11/14* | (2006.01) |
| *G06F 3/06* | (2006.01) |
| *G06F 12/02* | (2006.01) |

(52) U.S. Cl.
CPC .......... *G06F 11/1417* (2013.01); *G06F 3/064* (2013.01); *G06F 3/0614* (2013.01); *G06F 3/0679* (2013.01); *G06F 11/1407* (2013.01); *G06F 11/1441* (2013.01); *G06F 12/0246* (2013.01)

(58) Field of Classification Search
CPC ............ G06F 11/1407; G06F 11/1441; G06F 12/0246
See application file for complete search history.

(56) References Cited

U.S. PATENT DOCUMENTS

| | | | | |
|---|---|---|---|---|
| 5,845,326 A * | 12/1998 | Hirayama | ........... | G06F 11/1407 711/135 |
| 6,636,941 B1 * | 10/2003 | Gold | .................. | G06F 11/1441 711/111 |
| 8,880,787 B1 * | 11/2014 | Kimmel | .............. | G06F 11/1438 711/170 |
| 9,286,198 B2 * | 3/2016 | Bennett | ................. | G06F 3/0679 |
| 9,348,710 B2 * | 5/2016 | Al-Wahabi | ............ | G06F 11/203 |

(Continued)

*Primary Examiner* — Loan L. T. Truong
(74) *Attorney, Agent, or Firm* — IP & T Group LLP

(57) ABSTRACT

A memory system may include: a nonvolatile memory device including a plurality of memory blocks, each of which includes a plurality of pages, and among which a subset of memory blocks are managed as a system area and remaining memory blocks are managed as a normal area; and a controller may store system data, used to control the nonvolatile memory device, in the system area, and storing boot data, used in a host and normal data updated in a control operation for the nonvolatile memory device, in the normal area, the controller may perform a checkpoint operation each time storage of N number of boot data among the boot data is completed, and may perform the checkpoint operation each time the control operation for the nonvolatile memory device is completed, 'N' being a natural number.

16 Claims, 10 Drawing Sheets

(56) References Cited

U.S. PATENT DOCUMENTS

| | | | | |
|---|---|---|---|---|
| 10,073,651 | B2* | 9/2018 | Lee | G06F 3/0619 |
| 10,445,194 | B2* | 10/2019 | Lee | G06F 11/1072 |
| 2006/0053121 | A1* | 3/2006 | Zizys | G06F 11/1461 |
| | | | | 714/E11.122 |
| 2006/0168473 | A1* | 7/2006 | Sahoo | G06F 11/1471 |
| | | | | 714/15 |
| 2009/0089610 | A1* | 4/2009 | Rogers | G06F 11/1469 |
| | | | | 714/5.1 |
| 2009/0187394 | A1* | 7/2009 | Lin | G06F 30/33 |
| | | | | 703/14 |
| 2011/0307449 | A1* | 12/2011 | Cargille | G06F 16/128 |
| | | | | 707/648 |
| 2012/0117421 | A1* | 5/2012 | Craft | G06F 11/1469 |
| | | | | 714/15 |
| 2012/0303579 | A1* | 11/2012 | Aronovich | G06F 16/24552 |
| | | | | 707/615 |
| 2013/0179729 | A1* | 7/2013 | Chiu | G06F 12/16 |
| | | | | 714/19 |
| 2015/0127887 | A1* | 5/2015 | Kim | G11C 5/143 |
| | | | | 711/103 |
| 2018/0356998 | A1* | 12/2018 | Wu | G06F 12/0246 |

* cited by examiner

MEMORY SYSTEM AND OPERATING METHOD THEREOF

CROSS-REFERENCE TO RELATED APPLICATION

This application is a continuation of U.S. patent application Ser. No. 16/043,683 filed on Jul. 24, 2018, which claims benefits of priority of Korean Patent Application No. 10-2017-0174906 filed on Dec. 19, 2017. The disclosure of each of the foregoing application is incorporated herein by reference in its entirety.

BACKGROUND

1. Field

Various embodiments relate to a memory system. Particularly, the embodiments relate to a memory system capable of storing boot data used in a host and an operating method thereof.

2. Discussion of the Related Art

The computer environment paradigm has shifted to ubiquitous computing systems that can be used anytime and anywhere. As a result, use of portable electronic devices such as mobile phones, digital cameras, and laptop computers have rapidly increased. These portable electronic devices generally use a memory system having one or more memory devices for storing data. A memory system may be used as a main or an auxiliary storage device of a portable electronic device.

Memory systems may provide excellent stability, durability, high information access speed, and low power consumption because they have no moving parts, as compared with a hard disk device. Examples of memory systems having such advantages include universal serial bus (USB) memory devices, memory cards having various interfaces, and solid state drives (SSD).

SUMMARY

Various embodiments are directed to a memory system capable of efficiently storing and managing boot data used in a host and an operating method thereof.

In an embodiment, a memory system may include: a nonvolatile memory device including a plurality of memory blocks, each of which includes a plurality of pages, and among which a subset of memory blocks are managed as a system area and remaining memory blocks are managed as a normal area, and a controller may store system data, used to control the nonvolatile memory device, in the system area, and storing boot data, used in a host and normal data updated in a control operation for the nonvolatile memory device, in the normal area, the controller may perform a checkpoint operation each time storage of N number of boot data among the boot data is completed, and may perform the checkpoint operation each time the control operation for the nonvolatile memory device is completed, 'N' being a natural number.

The controller may store, in the system area, metadata of N number of boot data which are most recently stored through performing of the checkpoint operation, or metadata of normal data most recently updated in the control operation for the nonvolatile memory device.

The controller may search data stored in the normal area after the checkpoint operation performed most recently, by referring to the system area, to perform a recovery operation in response to the memory system being powered on after a sudden power-off (SPO) occurs, the controller may perform the recovery operation for normal data searched, and the controller may do not perform the recovery operation for boot data searched.

The controller may search data stored in the normal area by the unit of page in the recovery operation, may perform the recovery operation for normal data among data stored in searched pages, and does not perform the recovery operation for boot data among searched data.

The controller may search data stored in the normal area after the checkpoint operation performed most recently, by referring to the system area, to perform a recovery operation in response to the memory system being powered on after a sudden power-off (SPO) occurs, the controller may perform the recovery operation for normal data searched, the controller may perform the recovery operation for boot data searched within a predetermined search count, and the controller may do not perform the recovery operation for boot data searched after the predetermined search count.

The controller may search data stored in the normal area, by the unit of page in the recovery operation, when boot data are searched in a state in which the number of searched pages is less than the predetermined search count, the controller may perform the recovery operation for searched boot data, and when boot data are searched in a state in which the number of searched pages is greater than the predetermined search count, the controller may do not perform the recovery operation for searched boot data.

When the recovery operation is performed in response to the memory system being powered on after an SPO occurs, the controller may check how much a recovery operation time required to complete the recovery operation is shorter than a recovery limit time, the controller may adjust a value of 'N' depending on a checking result such that the adjusted value of 'N' is applied to the checkpoint operation to be performed next, and the controller may adjust a value of the predetermined search count depending on a checking result such that the adjusted value of the predetermined search count is applied to the recovery operation to be performed next.

The controller may relatively increase the value of 'N' and the value of the predetermined search count as the recovery limit time becomes relatively longer than the recovery operation time, and the controller may relatively decrease the value of 'N' and the value of the predetermined search count as the recovery limit time becomes relatively shorter than the recovery operation time.

The controller may check a percentage of valid data stored in the system area at each preselected time, the controller may adjust a value of 'N' depending on a checking result such that the adjusted value of 'N' is applied to the checkpoint operation to be performed next, and the controller may adjust a value of the predetermined search count depending on a checking result such that the adjusted value of the predetermined search count is applied to the recovery operation to be performed next.

The controller may relatively increase the value of 'N' and the value of the predetermined search count as the percentage of the valid data stored in the system area becomes relatively lower, and the controller may relatively decrease the value of 'N' and the value of the predetermined search count as the percentage of the valid data stored in the system area becomes relatively higher.

In an embodiment, a method for operating a memory system including a nonvolatile memory device including a plurality of memory blocks each of which includes a plurality of pages, and among which a subset of memory blocks are managed as a system area and remaining memory blocks are managed as a normal area, the method may include: storing system data, used to control the nonvolatile memory device, in the system area, and storing boot data, used in a host, and normal data, updated in a control operation for the nonvolatile memory device, in the normal area; and performing a checkpoint operation each time storage of N number of boot data among the boot data is completed, and performing the checkpoint operation each time the control operation for the nonvolatile memory device is completed, 'N' being a natural number.

The performing the checkpoint operation may include storing, in the system area, metadata of N number of boot data which are most recently stored, or metadata of normal data most recently updated in the control operation for the nonvolatile memory device.

The method may further include: performing first searching of data stored in the normal area after the checkpoint operation performed most recently, by referring to the system area, to perform a recovery operation in response to the memory system being powered on after a sudden power-off (SPO) occurs; and selectively performing the recovery operation for normal data searched in the first searching and not performing the recovery operation for boot data searched in the first searching.

The first searching may include searching data stored in the normal area by the unit of page in the recovery operation, and the selectively performing with respect to the first searching may include performing the recovery operation for normal data among data stored in pages searched in the first searching, and not performing the recovery operation for boot data among data searched in the first searching.

The method may further include: performing second searching of data stored in the normal area after the checkpoint operation performed most recently, by referring to the system area, to perform a recovery operation in response to the memory system being powered on after a sudden power-off (SPO) occurs; and selectively performing the recovery operation for normal data searched in the second searching, performing the recovery operation for boot data searched within a predetermined search count in the second searching, and not performing the recovery operation for boot data searched after the predetermined search count in the second searching.

The second searching may include searching data stored in the normal area by the unit of page in the recovery operation, and the selectively performing with respect to the second searching, when boot data are searched in a state in which the number of pages searched in the second searching is less than the predetermined search count, comprises performing the recovery operation for searched boot data, and not performing the recovery operation for searched boot data, when boot data are searched in a state in which the number of pages searched in the second searching is greater than the predetermined search count.

The method may further include: checking, in a first checking operation, when the recovery operation is performed in response to the memory system being powered on after an SPO occurs, how much a recovery operation time required to complete the recovery operation is shorter than a recovery limit time; and adjusting, in a first adjusting operation, a value of 'N' depending on a result of the first checking such that the adjusted value of 'N' is applied to the checkpoint operation to be performed next, and adjusting a value of the predetermined search count depending on a result of the first checking such that the adjusted value of the predetermined search count is applied to the recovery operation to be performed next.

The first adjusting may include: relatively increasing the value of 'N' and the value of the predetermined search count as the recovery limit time becomes relatively longer than the recovery operation time depending on a result of the first checking; and relatively decreasing the value of 'N' and the value of the predetermined search count as the recovery limit time becomes relatively shorter than the recovery operation time depending on a result of the first checking.

The method may further include: checking, in a second checking operation, a percentage of valid data stored in the system area, at each preselected time; and adjusting, in a second adjusting operation, a value of 'N' depending on a result of the second checking such that the adjusted value of 'N' is applied to the checkpoint operation to be performed next, and adjusting a value of the predetermined search count depending on a result of the second checking such that an adjusted value of the predetermined search count is applied to the recovery operation to be performed next.

The second adjusting may include: relatively increasing the value of 'N' and the value of the predetermined search count as the percentage of the valid data stored in the system area becomes relatively lower depending on a result of the second check act; and relatively decreasing the value of 'N' and the value of the predetermined search count as the percentage of the valid data stored in the system area becomes relatively higher depending on a result of the second check act.

In an embodiment, a memory system may include: a nonvolatile memory device including a plurality of memory blocks, each including a plurality of pages, wherein the plurality of memory blocks is divided into two distinct areas: a first area for system data, and a second area for boot data and operation data; and a controller may perform a checkpoint operation regarding at least one of the boot data and the operation data, when there is at least one of the boot data and the operation data updated by the checkpoint operation, the controller may be searching the at least one of the boot data and the operation and determining whether to perform a recovery operation based on which data is searched.

BRIEF DESCRIPTION OF THE DRAWINGS

Features and advantages of the present invention will become apparent to those skilled in the art to which the present invention pertains from the following detailed description in reference to the accompanying drawings, wherein.

DETAILED DESCRIPTION

Figure 1:
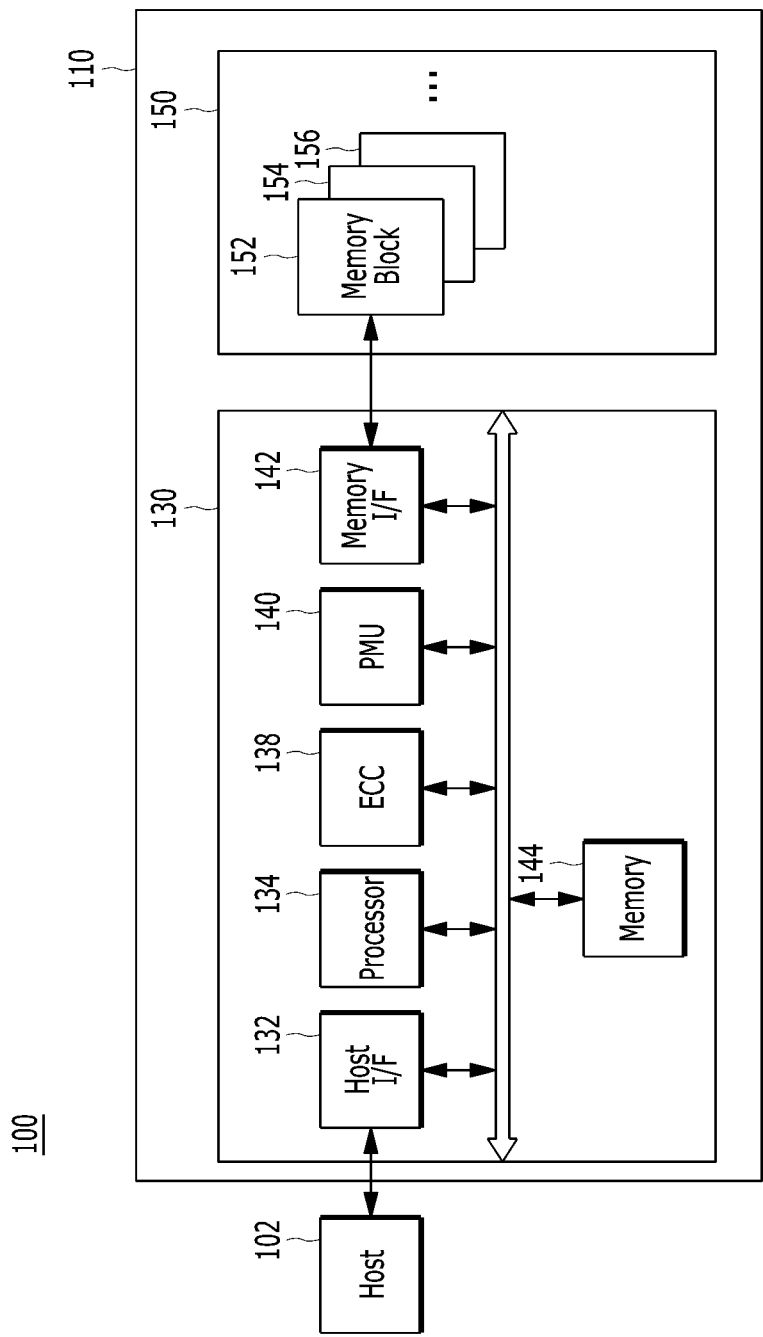
FIG. 1 is a block diagram illustrating a data processing system including a memory system in accordance with an embodiment of the present invention.

Various embodiments of the present invention are described below in more detail with reference to the accompanying drawings. It is noted, however, that the present invention may be embodied in other forms including variations of the disclosed embodiments and thus are not to be construed as being limited to the embodiments set forth herein. Rather, the described embodiments are provided so that this disclosure is thorough and complete and fully conveys the present invention to those skilled in the art to which this invention pertains. Throughout the disclosure, like reference numerals refer to like parts throughout the various figures and embodiments of the present invention. Also, throughout the description, reference to "an embodiment" or the like is not necessarily to only one embodiment, and different references to "an embodiment" or the like are not necessarily to the same embodiment(s).

It will be understood that, although the terms "first", "second", "third", and or the like may be used herein to identify various elements, these elements are not limited by these terms. These terms are used to distinguish one element from another element that otherwise have the same or similar names. Thus, a first element described below could also be termed as a second or third element without departing from the spirit and scope of the present invention.

The drawings are not necessarily to scale and, in some instances, proportions may have been exaggerated in order to clearly illustrate features of the embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments and is not intended to be limiting of the present invention. As used herein, singular forms are intended to include the plural forms and vice versa, unless the context clearly indicates otherwise. It will be further understood that the terms "comprises," "comprising," "includes," and "including" when used in this specification, specify the presence of the stated elements but do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention pertains in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

FIG. 1 is a block diagram illustrating a data processing system 100 including a memory system 110 in accordance with an embodiment of the present invention.

Referring to FIG. 1, the data processing system 100 may include a host 102 and the memory system 110.

By way of example but not limitation, the host 102 may include portable electronic devices such as a mobile phone, MP3 player and laptop computer or non-portable electronic devices such as a desktop computer, a game machine, a TV and a projector.

The memory system 110 may operate to store data for the host 102 in response to a request of the host 102. Non-limiting examples of the memory system 110 may include a solid state drive (SSD), a multi-media card (MMC), a secure digital (SD) card, a universal storage bus (USB) device, a universal flash storage (UFS) device, compact flash (CF) card, a smart media card (SMC), a personal computer memory card international association (PCMCIA) card and memory stick. The MMC may include an embedded MMC (eMMC), a reduced size MMC (RS-MMC) and/or a micro-MMC. The SD card may include a mini-SD card and/or a micro-SD card.

The memory system 110 may be embodied by various types of storage devices. Non-limiting examples of storage devices included in the memory system 110 may include volatile memory devices such as a DRAM dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM) and a flash memory. The flash memory may have a 3-dimensional (3D) stack structure.

The memory system 110 may include a memory device 150 and a controller 130. The memory device 150 may store data for the host 120. The controller 130 may control data storage into the memory device 150.

The controller 130 and the memory device 150 may be integrated into a single semiconductor device, which may be included in the various types of memory systems as described above.

Non-limiting applications of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even though power is not supplied. The memory device 150 may store data provided from the host 102 through a write operation. The memory device 150 may output data stored therein to the host 102 through a read operation. The memory device 150 may include a plurality of memory dies (not shown), each memory die including a plurality of planes (not shown). Each plane may include a plurality of memory blocks 152, 154, 156, . . . (hereinafter, referred to as "memory blocks 152 to 156"), each of which may include a plurality of pages. Each of the pages may include a plurality of memory cells coupled to a word line.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, write, program and erase operations of the memory device 150.

The controller 130 may include a host interface (I/F) 132, a processor 134, an error correction code (ECC) component 138, a Power Management Unit (PMU) 140, a memory interface (I/F) 142 such as a NAND flash controller (NFC), and a memory 144, operatively coupled to, or in electrical communication with, each of the other via an internal bus.

The host interface 132 may be configured to process a command and data of the host 102, and may communicate with the host 102 according to one or more of various interface protocols such as universal serial bus (USB), multi-media card (MMC), peripheral component interconnect-express (PCI-E), small computer system interface (SCSI), serial-attached SCSI (SAS), serial advanced technology attachment (SATA), parallel advanced technology attachment (PATA), enhanced small disk interface (ESDI) and integrated drive electronics (IDE).

The ECC component 138 may detect and correct an error contained in the data read from the memory device 150. In other words, the ECC component 138 may perform an error correction decoding process to the data read from the memory device 150 through an ECC code used during an ECC encoding process. According to a result of the error correction decoding process, the ECC component 138 may output a signal, for example, an error correction success or fail signal. When the number of error bits is more than a threshold value of correctable error bits, the ECC component 138 may not correct the error bits, and instead may output an error correction fail signal.

The ECC component 138 may perform error correction through a coded modulation such as Low Density Parity Check (LDPC) code, Bose-Chaudhri-Hocquenghem (BCH) code, turbo code, Reed-Solomon code, convolution code, Recursive Systematic Code (RSC), Trellis-Coded Modulation (TCM) and Block coded modulation (BCM). However, the ECC component 138 is not limited to these error correction techniques. As such, the ECC component 138 may include all circuits, modules, systems or devices for error correction.

The PMU 140 may manage electrical power used and provided in the controller 130.

The memory interface 142 may serve as a memory/storage interface for interfacing the controller 130 and the memory device 150 such that the controller 130 controls the memory device 150 in response to a request from the host 102. When the memory device 150 is a flash memory or specifically a NAND flash memory, the memory interface 142 may generate a control signal for the memory device 150 and process data, inputted to the memory device 150 under the control of the processor 134. The memory interface 142 may work as an interface (e.g., a NAND flash interface) for processing a command and data between the controller 130 and the memory device 150. Specifically, the memory interface 142 may support data transfer between the controller 130 and the memory device 150.

The memory 144 may serve as a working memory of the memory system 110 and the controller 130. The memory 144 may store data for operations of the memory system 110 and the controller 130. The controller 130 may control the memory device 150 to perform read, write, program and erase operations in response to a request from the host 102. The controller 130 may output data read from the memory device 150 to the host 102, and may store data provided from the host 102 into the memory device 150. The memory 144 may store data required for the controller 130 and the memory device 150 to perform these operations.

The memory 144 may be embodied by a volatile memory. By way of example but not limitation, the memory 144 may be embodied by a static random access memory (SRAM) or a dynamic random access memory (DRAM). The memory 144 may be disposed within or externally to the controller 130. FIG. 1 illustrates an embodiment of the memory 144 disposed within the controller 130. In another embodiment, the memory 144 may be embodied by an external volatile memory having a memory interface transferring data between the memory 144 and the controller 130.

The processor 134 may control the overall operations of the memory system 110. The processor 134 may use firmware to control overall operations of the memory system 110. The firmware may be referred to as a flash translation layer (FTL).

The processor 134 of the controller 130 may include a management unit (not illustrated) for performing a bad management operation of the memory device 150. The management unit may perform a bad block management operation of checking a bad block, among the plurality of memory blocks 152 to 156 in the memory device 150. The bad block may be a block in which a program fail occurred during a program operation due to a characteristic of a NAND flash memory. The management unit may write the program-failed data of the bad block to a new memory block. In the memory device 150 having a 3D stack structure, the bad block management operation may reduce the use efficiency of the memory device 150 and the reliability of the memory system 110. Thus, the bad block management operation needs to be performed with more reliability.

Figure 2:
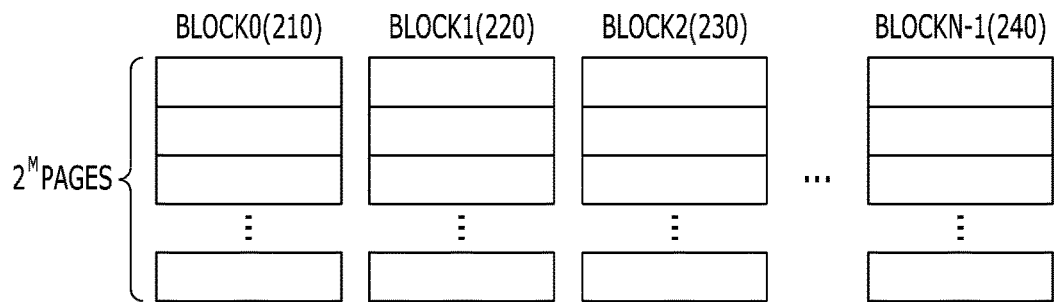
FIG. 2 is a schematic diagram illustrating an exemplary configuration of a memory device employed in the memory system shown in FIG. 1.

FIG. 2 is a schematic diagram illustrating an exemplary configuration of the memory device 150.

Referring to FIG. 2, the memory device 150 may include a plurality of memory blocks 0 to N−1, e.g., BLOCK0(210), BLOCK1(220), BLOCK2(230), to BLOCKN−1(240), each of which may include a plurality of pages, for example, $2^M$ pages, the number of which may vary according to circuit design. Memory cells included in the respective memory blocks 0 to N−1 may be one or more of a single level cell (SLC) storing 1-bit data, or a multi-level cell (MLC) storing 2- or more bit data. In an embodiment, the memory device 150 may include a plurality of triple level cells (TLC), each storing 3-bit data. In another embodiment, the memory device may include a plurality of quadruple level cells (QLC), each storing 4-bit level cell.

Figure 3:
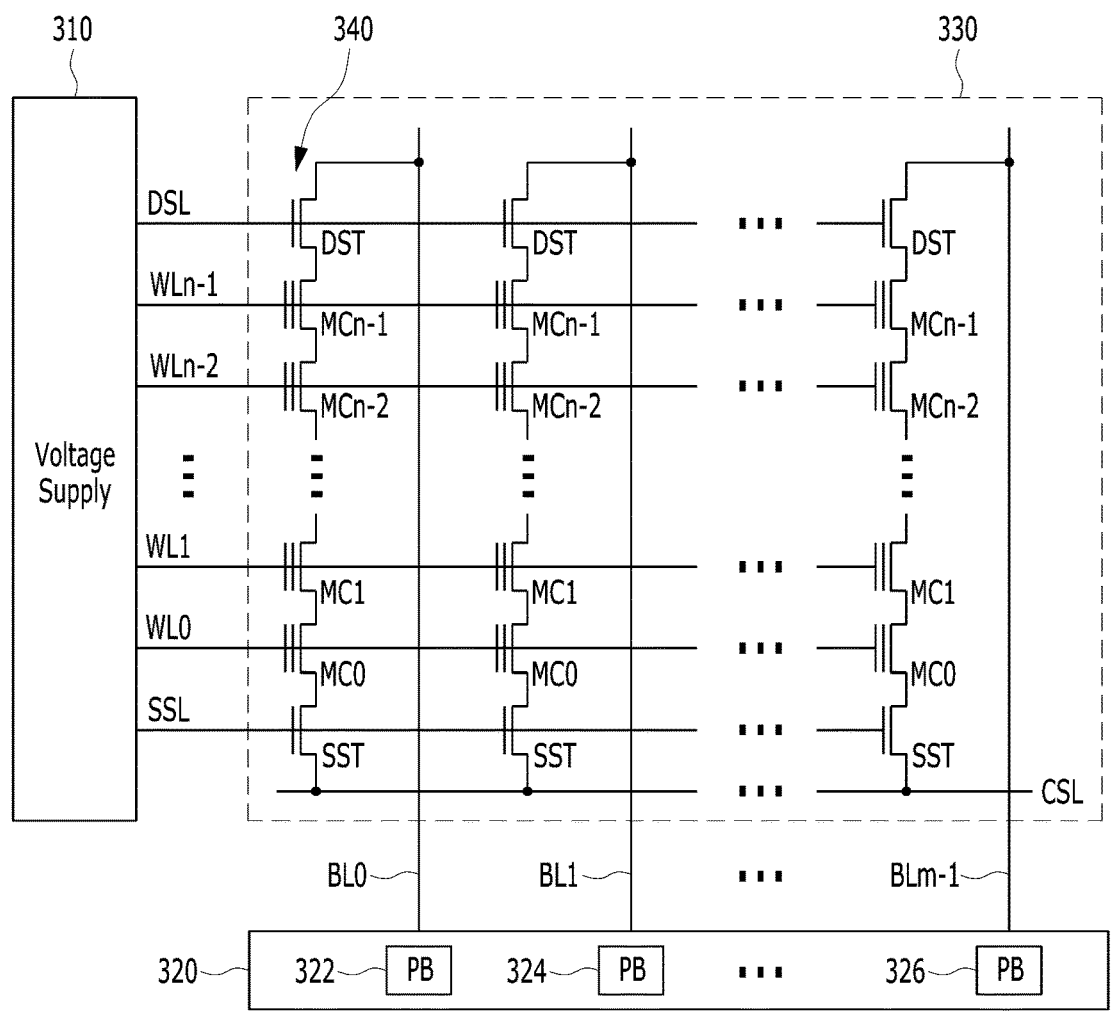
FIG. 3 is a circuit diagram illustrating an exemplary configuration of a memory cell array of a memory block in the memory device shown in FIG. 2.

FIG. 3 is a circuit diagram illustrating an exemplary configuration of a memory cell array of a memory block in the memory device 150.

Referring to FIG. 3, a memory block 330 which may correspond to any of the plurality of memory blocks 152 to 156 included in the memory device 150 of the memory system 110 may include a plurality of cell strings 340 coupled to a plurality of corresponding bit lines BL0 to BLm−1. The cell string 340 of each column may include one or more drain select transistors DST and one or more source select transistors SST. Between the drain and source select transistors DST, SST, a plurality of memory cells MC0 to MCn−1 may be coupled in series. In an embodiment, each of the memory cell transistors MC0 to MCn−1 may be embodied by an MLC capable of storing data information of a plurality of bits. Each of the cell strings 340 may be electrically coupled to a corresponding bit line among the plurality of bit lines BL0 to BLm−1. For example, as illustrated in FIG. 3, the first cell string is coupled to the first bit line BL0, and the last cell string is coupled to the last bit line BLm−1.

Although FIG. 3 illustrates NAND flash memory cells, the invention is not limited in this way. The memory cells may be NOR flash memory cells, or hybrid flash memory cells including two or more kinds of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply 310 which provides word line voltages including a program voltage, a read voltage and a pass voltage to supply to the word lines according to an operation mode. The voltage generation operation of the voltage supply 310 may be controlled by a control circuit (not illustrated). Under the control of the control circuit, the voltage supply 310 may select one of the memory blocks (or sectors) of the memory cell array, select one of the word lines of the selected memory block, and provide the word line voltages to the selected word line and the unselected word lines as may be needed.

The memory device 150 may include a read/write circuit 320 which is controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and may supply a current or a voltage to bit lines according to the received data. The read/write circuit 320 may include a plurality of page buffers 322 to 326 respectively corresponding to columns (or bit lines) or column pairs (or bit line pairs). Each of the page buffers 322 to 326 may include a plurality of latches (not illustrated).

Figure 4:
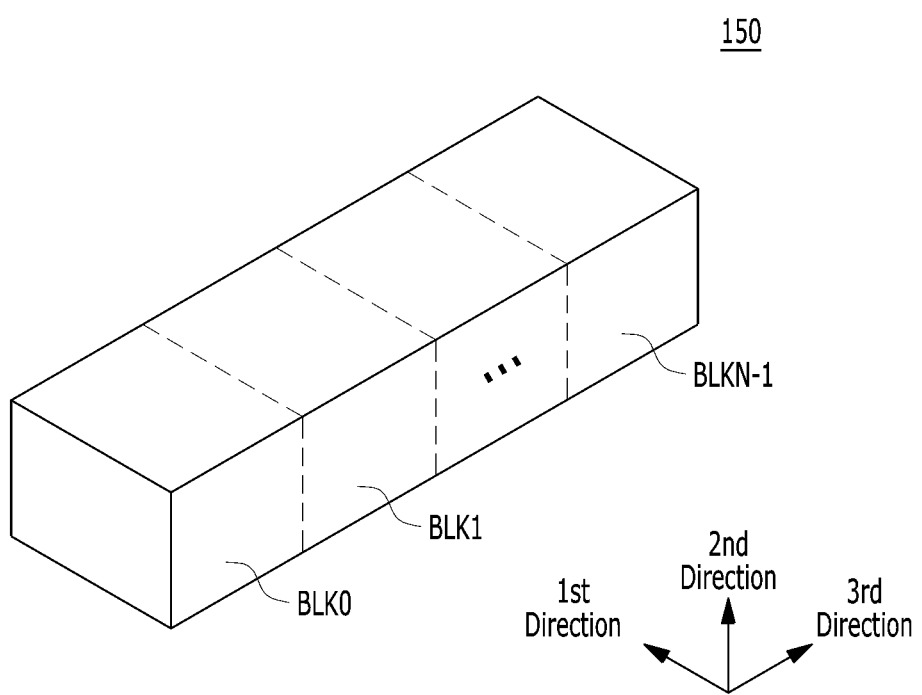
FIG. 4 is a schematic diagram illustrating an exemplary three-dimensional structure of the memory device shown in FIG. 2.

FIG. 4 is a schematic diagram illustrating an exemplary 3D structure of the memory device 150.

The memory device 150 may be embodied by a 2D or 3D memory device. Specifically, as illustrated in FIG. 4, the memory device 150 may be embodied by a nonvolatile memory device having a 3D stack structure. When the memory device 150 has a 3D structure, the memory device 150 may include a plurality of memory blocks BLK0 to BLKN−1 each having a 3D structure (or vertical structure).

Detailed description with reference to FIGS. 5 to 8 is provided for data processing with respect to the memory device 150 in a memory system in accordance with an embodiment, particularly, a data processing operation of performing a command operation corresponding to a command received from the host 102 and a data management operation.

Figure 5:
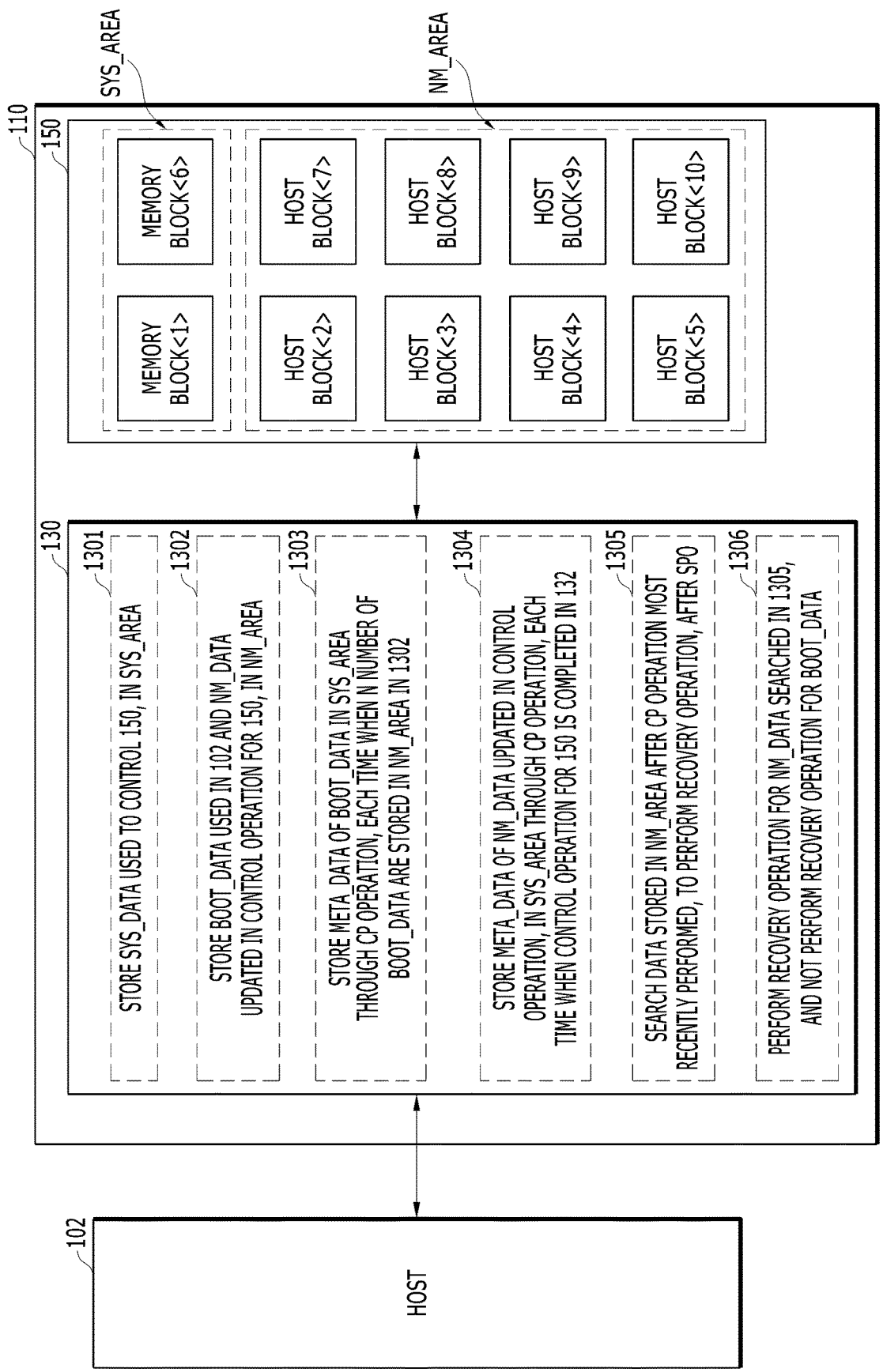
FIGS. 5 and 6 are block diagrams illustrating examples of a memory system in accordance with an embodiment of the disclosure.
Figure 6:
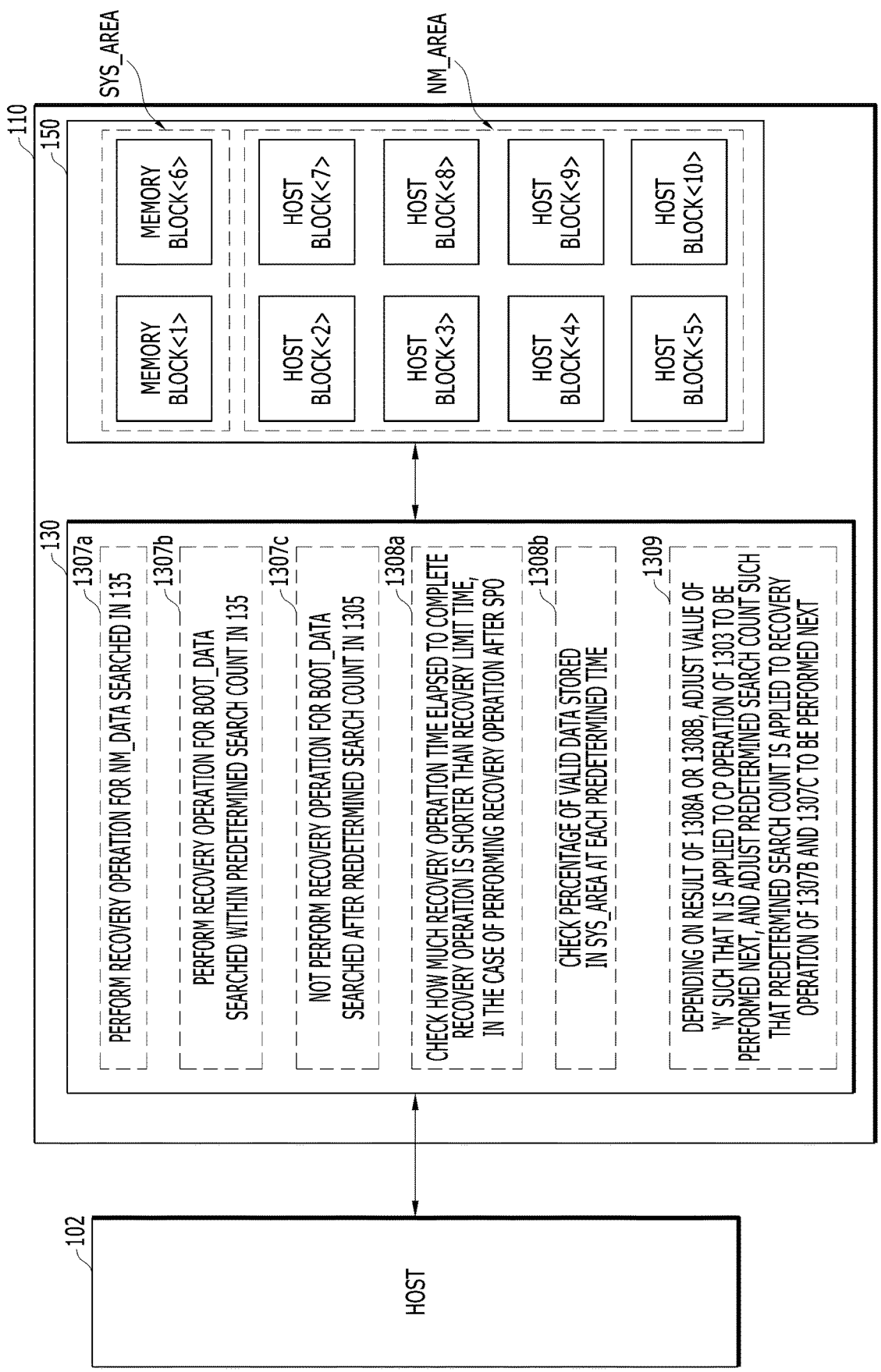

FIGS. 5 and 6 are block diagrams illustrating examples of a memory system in accordance with an embodiment of the disclosure.

Referring to FIGS. 5 and 6, a configuration of a data processing system 100 including a host 102 and a memory system 110, similar to the data processing system 100 shown in FIG. 1, is illustrated.

As described above with reference to FIG. 1, the memory system 110 of FIGS. 5 and 6 may include a controller 130 and a nonvolatile memory device 150.

The nonvolatile memory device 150 may include a plurality of memory blocks MEMORY BLOCK<1:10> as described above with reference to FIG. 1.

For reference, while a configuration in which only one nonvolatile memory device 150 is included in the memory system 110 is illustrated in FIG. 5, this is for clarity of illustration and ease in explanation; a larger number of nonvolatile memory devices may be included. Similarly, the present invention is not limited to the configuration in which 10 memory blocks MEMORY BLOCK<1:10> are included in the nonvolatile memory device 150, as illustrated in FIG. 5; a larger number of memory blocks may be included. While not directly shown in FIG. 5, a plurality of pages are included in each of the memory blocks MEMORY BLOCK<1:10> as described above with reference to FIG. 2.

In FIG. 5, the controller 130 may include a host interface 132, a processor 134, an ECC component 138, a power management unit 140, a NAND flash controller 142 and a memory 144, which are illustrated in FIG. 1. These elements are omitted from the controller 130 of FIG. 5 to more clearly illustrate other features.

In detail, the nonvolatile memory device 150 includes the plurality of memory blocks MEMORY BLOCK<1:10>, each including a plurality of pages (not shown). Among the memory blocks MEMORY BLOCK<1:10>, a predetermined number of memory blocks, e.g., MEMORY BLOCK<1, 6>, are managed as a system area SYS_AREA, while the remaining memory blocks, e.g., BLOCK<2:5, 7:10> are managed as a normal area NM_AREA. That is, the memory blocks MEMORY BLOCK<1:10> in the nonvolatile memory device 150 are divided into the system area SYS_AREA and the normal area NM_AREA for management by the controller 130.

The controller 130 stores system data SYS_DATA, used to control the nonvolatile memory device 150, in the system area SYS_AREA of the nonvolatile memory device 150 (step 1301). The controller 130 stores boot data BOOT_DATA, used in the host 102, in the normal area NM_AREA of the nonvolatile memory device 150 (step 1302). The controller 130 stores normal data NM_DATA, updated in a control operation for the nonvolatile memory device 150, in the normal area NM_AREA of the nonvolatile memory device 150 (step 1302). That is, the controller 130 stores both the boot data BOOT_DATA and the normal data NM_DATA in the normal area NM_AREA of the nonvolatile memory device 150.

The system data SYS_DATA comprises data necessary to control the general operations of the memory system 110, and may include firmware data, mapping data, and the like.

By way of example but not limitation, the system data SYS_DATA may be used as follows. The memory system 110 is powered on when electrical power is supplied to the memory system 110. When the controller 130 is powered on, the processor 134 may load the system data SYS_DATA stored in the system area SYS_AREA of the nonvolatile memory device 150. The processor 134 may mount the system data SYS_DATA in the memory 144 in the controller 130. The processor 134 may control the operation of the nonvolatile memory device 150 based on the mounted system data SYS_DATA. This method for using the system data SYS_DATA is an example. The system data SYS_DATA may be used in various other ways depending on design requirements or user demand.

The boot data BOOT_DATA may include program data which can read an operating system from an external memory such as the memory system 110 and mount the operating system in a main memory (not shown) in the host 102, such that, when booting or starting the host 102 represented by an electronic apparatus such as a computer, a user may use the electronic apparatus.

If the boot data BOOT_DATA stored in the memory system 110 are not mounted in the main memory in the host 102 within a preset time, the booting of the host 102 fails.

To avoid the failure, a conventional method includes storing the boot data BOOT_DATA in a specific area, which is referred to as a boot partition, and then booting the host by using a stored bootloader image for a fast mount operation and operation reliability. In other words, conventionally, a boot area, which is not required in the present disclosure, is further included in the memory system, in addition to the system area SYS_AREA and the normal area NM_AREA, and the boot data BOOT_DATA are stored in the boot area and then managed.

However, if the boot data BOOT_DATA are stored in the separate area such as the boot area/partition as in the conventional art, system management is complicated when the boot data BOOT_DATA should be updated, due to damage of data, debugging, memory initialization, clock initialization, etc.

In the memory system 110 in accordance with embodiments of the present disclosure, a method is provided in which the boot data BOOT_DATA are stored in the normal area NM_AREA together with the normal data NM_DATA, and are then managed (step 1302). Namely, the memory system 110 in accordance with an embodiment of the present disclosure does not require an additional, separate area for storing the boot data BOOT_DATA. Both the boot data BOOT_DATA and the normal data NM_DATA can be stored in the normal area NM_AREA (step 1302).

In the memory system 110 in accordance with embodiments of the present disclosure, distinguishing or differentiating a method for managing the boot data BOOT_DATA and a method for managing the normal data NM_DATA, does not affect but maintains high reliability of the boot data BOOT_DATA, as compared with the conventional approach.

In detail, the controller 130 may store the normal data NM_DATA, updated in a control operation for the nonvolatile memory device 150, in the normal area NM_AREA of the nonvolatile memory device 150 (step 1302).

The control operation for the nonvolatile memory device 150 may include not only a foreground operation for reading/writing/erasing data in the nonvolatile memory device 150 but also a background operation such as garbage collection/read reclaim. That is to say, the control operation may include any and all operations of the nonvolatile memory device 150, which are controlled by the controller 130.

In the disclosure, the normal data NM_DATA may be updated during a control operation for the nonvolatile memory device 150. Non-limiting examples of the control operations to update normal data NM_DATA may include an operation of storing the normal data NM_DATA inputted from the host 102 with a write request in the normal area NM_AREA of the nonvolatile memory device 150, as well as an operation of copying or moving the normal data NM_DATA stored in the normal area NM_AREA of the nonvolatile memory device 150 into the normal area NM_AREA either in response to a request of the host 102 or as determined by the controller 130.

The controller 130 performs a checkpoint (CP) operation each time a control operation for the nonvolatile memory device 150 is completed. The controller 130 performs the checkpoint (CP) operation at a time when the control operation for the nonvolatile memory device 150 is achieved or completed, regardless of the number or quantity of normal data NM_DATA stored in the normal area NM_AREA from a time when the control operation for the nonvolatile memory device 150 is started (step 1304). Therefore, the number of the normal data NM_DATA stored in the normal area NM_AREA and whether to perform the checkpoint (CP) operation are not related with each other.

By way of example but not limitation, after a control operation for the nonvolatile memory device 150 is started, the controller 130 may manage metadata META_DATA of updated normal data NM_DATA, which are completely stored in the normal area NM_AREA, only in the volatile memory 144 in the controller 130. At a time when the control operation for the nonvolatile memory device 150 is completed, the controller 130 moves or copies the metadata META_DATA of the updated normal data NM_DATA, which have been managed in the volatile memory 144 in the controller 130 and completely stored in the normal area NM_AREA, to the system area SYS_AREA of the nonvolatile memory device 150, through a checkpoint (CP) operation.

The controller 130 may perform a checkpoint (CP) operation each time N number of boot data among the boot data BOOT_DATA is stored. Namely, the controller 130 may check or count how many boot data BOOT_DATA, are inputted from the host 102 and completely stored in the normal area NM_AREA. The controller 130 may perform the checkpoint (CP) operation when the checked or counted number is 'N' (step 1303). The checked or counted number is initialized by the checkpoint (CP) operation. Therefore, the number of the boot data BOOT_DATA stored in the normal area NM_AREA and whether to perform the checkpoint (CP) operation are related with each other.

By way of example but not limitation, until the number of boot data BOOT_DATA, inputted from the host 102 after a checkpoint (CP) operation is performed, that are completely stored in the normal area NM_AREA becomes N, the controller 130 stores, updates, or manages the metadata META_DATA of the boot data BOOT_DATA only in the volatile memory 144 in the controller 130. Then, when the Nth boot data BOOT_DATA is completely stored in the normal area NM_AREA, the controller 130 performs a checkpoint (CP) operation to store the metadata META_DATA of the N number of boot data BOOT_DATA, completely stored and updated most recently in the normal area NM_AREA, in the system area SYS_AREA. Here, 'N' is a natural number.

For example, if 'N' is 1, a checkpoint (CP) operation may be performed in response to a single boot data BOOT_DATA having been inputted from the host 102 and completely stored in the normal area NM_AREA.

For another example, when 'N' is 3, a checkpoint (CP) operation may be performed in response to every three boot data BOOT_DATA inputted from the host 102 and completely stored in the normal area NM_AREA.

In this way, depending on the value of 'N,' it is possible to selectively determine a relationship between the number or quantity of the boot data BOOT_DATA stored in the normal area NM_AREA and whether to perform the checkpoint (CP) operation. When the value of 'N' is small, the checkpoint (CP) operation may be performed more frequently than when the value of 'N' is large.

While the value of 'N' may be fixed according to a system requirement or user demand, it is also possible to dynamically adjust the value of 'N' according to the determination of the host 102 or the controller 130 in the operation process of the memory system 110.

When the memory system 110 is powered on after an SPO (sudden power-off) occurs, the controller 130 searches the data, stored in the normal area NM_AREA after a most recently performed checkpoint (CP) operation, based on or with reference to the system area SYS_AREA, in order to perform a recovery operation (step 1305). In other words, in the case where the memory system 110 is powered on after an SPO occurs, the controller 130 searches data of which reliability is not secured through a checkpoint (CP) operation before the SPO occurs, to perform a recovery operation.

It is not known in advance whether normal data NM_DATA or boot data BOOT_DATA are to be searched in the search operation 135 of the controller 130. In a case where searched data are boot data BOOT_DATA, the controller 130 performs a recovery operation by using one of the following two methods.

In a first method, a recovery operation is performed for the normal data NM_DATA searched in the search operation 135 of the controller 130. A recovery operation is not performed unconditionally for the boot data BOOT_DATA searched in the search operation 135 of the controller 130 (step 1306).

Namely, in the first method, the controller 130 does not attempt a recovery operation for boot data BOOT_DATA, which are stored in the normal area NM_AREA, but their metadata META_DATA are not stored in the system area SYS_AREA through a checkpoint (CP) operation. Conversely, in the first method, in a case where the data searched in the search operation (step 1305) are normal data NM_DATA only, the controller 130 performs a recovery operation in a sequence in which they are searched.

The controller 130 searches data by the unit of page in the normal area NM_AREA for a recovery operation. Therefore, in the first method, in the case where boot data BOOT_DATA exist among the data stored in the pages searched through the search operation (step 1305), the controller 130 does not attempt a recovery operation. A page storing the boot data BOOT_DATA searched in the search operation (step 1305) is converted into an invalid state. Conversely, in the first method, on the pages storing normal data NM_DATA among the data searched through the search operation (step 1305), the controller 130 performs a recovery operation in a sequence in which they are searched. Thus, a page storing normal data NM_DATA, for which a recovery operation has succeeded are stored, remains in a valid state, but a page storing normal data NM_DATA for which a recovery operation has failed reverts to an invalid state.

In a second method, a recovery operation is performed for the normal data NM_DATA searched in the search operation (step 1305) of the controller 130 (step 1307a), a recovery operation is performed for the boot data BOOT_DATA searched within a predetermined search count as a result of searching (step 1307b), and a recovery operation is not performed for the boot data BOOT_DATA searched after the predetermined search count as a result of searching (step 1307c).

In the second method, the controller 130 determines whether to perform a recovery operation, based on whether boot data BOOT_DATA are searched within the predetermined search count in the search operation (step 1305), when the boot data BOOT_DATA are stored in the normal area NM_AREA but their metadata META_DATA are not stored in the system area SYS_AREA through a checkpoint (CP) operation. Conversely, in the second method, in a case where the data searched in the search operation (step 1305) are normal data NM_DATA, the controller 130 performs a recovery operation in a sequence in which they are searched.

The controller 130 searches data by the unit of page in the normal area NM_AREA for a recovery operation. In the second method, in a case where boot data BOOT_DATA are searched in a state in which the number of the pages searched through the search operation (step 1305) is less than the value of the predetermined search count, the controller 130 performs a recovery operation for the searched boot data BOOT_DATA. Thus, a page storing boot data BOOT_DATA, for which a recovery operation has succeeded, retains a valid state, and a page storing boot data BOOT_DATA, for which a recovery operation has failed, is converted into an invalid state. Also, in the second method, the controller 130 does not perform a recovery operation for the searched boot data BOOT_DATA in pages exceeding the predetermined search count. Thus, a page in which the boot data BOOT_DATA searched in the state in which the number of the pages, searched through the search operation (step 1305), is greater than the value of the predetermined search count are stored is converted into an invalid state.

In the recovery operation of the controller 130 according to the above-described second method, the value of the predetermined search count may determine the maximum number of boot data BOOT_DATA to be recovered through the recovery operation in advance. By way of example but not limitation, in the case where the value of the predetermined search count is '5,' boot data BOOT_DATA from a minimum of '0' to a maximum of '5' through the search operation (step 1305) may be subject to a recovery operation. Similarly, in the case where the value of the predetermined search count is '3,' the number of boot data BOOT_DATA to be the target of a recovery operation through the search operation (step 1305) may be from a minimum of '0' to a maximum of '3.'

While the controller 130 is configured to selectively perform one of the recovery operations according to the first method and the second method according to a system requirement or user demand, it is also possible to dynamically select one of the first method and the second method by determination of the host 102 or the controller 130 in the operation process of the memory system 110.

Also, while the value of the predetermined search count used as a reference for determining whether to perform the recovery operation of the controller 130 according to the second method may be fixed according to a system requirement, it is also possible to dynamically adjust the value of the predetermined search count according to the determination of the host 102 or the controller 130 in the operation process of the memory system 110.

In a case where a recovery operation has been performed in response to that the memory system 110 is powered on after an SPO occurs, the controller 130 may check how much the 'recovery operation time' required to complete the recovery operation is shorter than a 'recovery limit time' (step 1308a).

The recovery operation of the controller 130 should be completed within a predetermined time, that is, the 'recovery limit time.' If the recovery operation of the controller 130 is not completed within the 'recovery limit time,' it is determined that the recovery operation of the controller 130 has failed.

Therefore, in a case where the recovery operation of the controller 130 is normally completed, the 'recovery operation time' required for the recovery operation of the controller 130 should be shorter than the 'recovery limit time.' In this regard, how much the 'recovery operation time' is shorter than the 'recovery limit time' may vary depending on various internal or external factors such as the state of the host 102, the state of the memory system 110 or the like.

If the recovery operation of the controller 130 is completed, the controller 130 may check how much the 'recovery operation time' required to complete the recovery operation is shorter than the predetermined 'recovery limit time' (step 1308a).

In this way, after checking the information on how much the 'recovery operation time' required to complete the recovery operation is less than the predetermined 'recovery limit time,' the controller 130 may adjust the value of 'N' depending on a result of checking such that an adjusted value of 'N' may be applied to a checkpoint (CP) operation to be performed next (step 1309). Also, depending on a result of checking, it is possible to select whether to perform a recovery operation according to the first method or the second method. Moreover, in a case of performing a recovery operation according to the second method, the value of the predetermined search count may be adjusted depending on a result of checking such that an adjusted value of the predetermined search count may be applied to a recovery operation to be performed next (step 1309).

By way of example but not limitation, the value of 'N' and the value of the predetermined search count may be relatively increased as the 'recovery limit time' becomes relatively longer than the 'recovery operation time.' The value of 'N' and the value of the predetermined search count may be relatively decreased as the 'recovery limit time' becomes relatively shorter than the 'recovery operation time.'

The controller 130 may check the percentage of the valid data stored in the system area SYS_AREA of the nonvolatile memory device 150 at each preselected time (step 1308b).

The preselected time may be determined according to a request of the host 102 or may be defined in advance according to a system requirement or user demand. By way of example but not limitation, the controller 130 may be requested to perform the operation (step 1308b) at an irregular specific time in the internal operation process of the host 102. In this case, the irregular specific time will be the preselected time. Alternatively, the controller 130 may perform by itself the operation (step 1308b) at each time a checkpoint (CP) operation is repeated a predetermined number of times. In this case, a time at which the checkpoint (CP) operation is repeated the predetermined number of times will be the preselected time.

In this way, after checking the percentage of the valid data stored in the system area SYS_AREA of the nonvolatile memory device 150 at each preselected time, the controller 130 may adjust the value of 'N' depending on a result of checking such that an adjusted value of 'N' may be applied to a checkpoint (CP) operation to be performed next (step 1309). Also, depending on a result of checking, it is possible to select whether to perform a recovery operation according to the first method or the second method. Moreover, in the case of performing a recovery operation according to the second method, the value of the predetermined search count may be adjusted depending on a result of checking such that an adjusted value of the predetermined search count may be applied to a recovery operation to be performed next (step 1309).

By way of example but not limitation, the value of 'N' and the value of the predetermined search count may be relatively increased as the percentage of the valid data stored in the system area SYS_AREA of the nonvolatile memory device 150 becomes relatively low. The value of 'N' and the value of the predetermined search count may be relatively decreased as the percentage of the valid data stored in the system area SYS_AREA of the nonvolatile memory device 150 becomes relatively high.

FIGS. 7 to 15 are diagrams schematically illustrating exemplary applications of the data processing system of FIG. 1.

Figure 7:
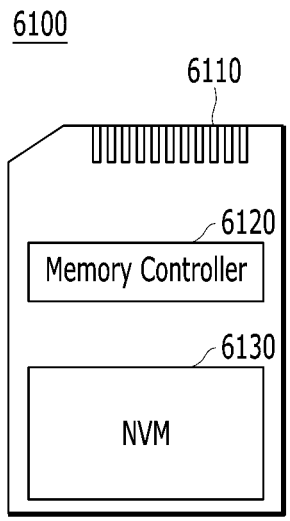
FIGS. 7 to 15 are diagrams schematically illustrating application examples of the data processing system shown in FIG. 1 in accordance with various embodiments of the present invention.

FIG. 7 is a diagram schematically illustrating an application example of the data processing system including the memory system in accordance with an embodiment. FIG. 7 schematically illustrates a memory card system to which the memory system may be applied.

Referring to FIG. 7, the memory card system 6100 may include a memory controller 6120, a memory device 6130 and a connector 6110.

The memory controller 6120 may be connected to the memory device 6130 embodied by a nonvolatile memory. The memory controller 6120 may be configured to access the memory device 6130. For example, the memory controller 6120 may be configured to control read, write, erase and background operations of the memory device 6130. The memory controller 6120 may be configured to provide an interface between the memory device 6130 and a host, and use firmware for controlling the memory device 6130. That is, the memory controller 6120 may correspond to the controller 130 of the memory system 110 described with reference to FIGS. 1 and 5, and the memory device 6130 may correspond to the memory device 150 of the memory system 110 described with reference to FIGS. 1 and 5.

Thus, the memory controller 6120 may include a RAM, a processor, a host interface, a memory interface and an error correction unit. The memory controller 130 may further include the elements shown in FIG. 5.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system in accordance with an embodiment may be applied to wired/wireless electronic devices, particularly mobile electronic devices.

The memory device 6130 may be implemented by any of various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (SU-RAM). The memory device 6130 may include a plurality of dies as in the memory device 150 of FIG. 5.

The memory controller 6120 and the memory device 6130 may be integrated into a single semiconductor device. For example, the memory controller 6120 and the memory device 6130 may be so integrated to form a solid state driver (SSD). Also, the memory controller 6120 and the memory device 6130 may be so integrated to form a memory card such as a PC card (PCMCIA: Personal Computer Memory Card International Association), a compact flash (CF) card, a smart media card (e.g., SM and SMC), a memory stick, a multimedia card (e.g., MMC, RS-MMC, MMCmicro and eMMC), an SD card (e.g., SD, miniSD, microSD and SDHC) and/or a universal flash storage (UFS).

Figure 8:
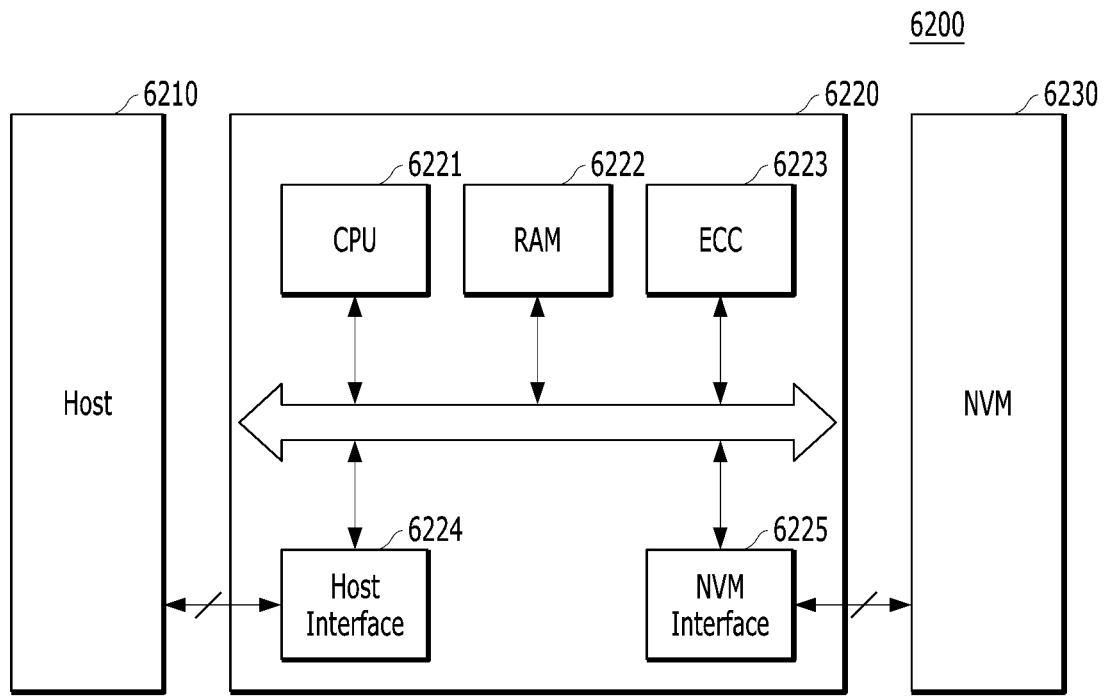

FIG. 8 is a diagram schematically illustrating another example of the data processing system including the memory system in accordance with an embodiment.

Referring to FIG. 8, the data processing system 6200 may include a memory device 6230 having one or more nonvolatile memories and a memory controller 6220 for controlling the memory device 6230. The data processing system 6200 illustrated in FIG. 8 may serve as a storage medium such as a memory card (CF, SD, micro-SD or the like) or USB device, as described with reference to FIG. 1. The memory device 6230 may correspond to the memory device 150 in the memory system 110 illustrated in FIGS. 1 and 5. The memory controller 6220 may correspond to the controller 130 in the memory system 110 illustrated in FIGS. 1 and 5.

The memory controller 6220 may control a read, write or erase operation on the memory device 6230 in response to a request of the host 6210. The memory controller 6220 may include one or more CPUs 6221, a buffer memory such as RAM 6222, an ECC circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221. The RAM 6222 may be used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the ECC component 138 of the controller 130 illustrated in FIG. 1. As described with reference to FIG. 1, the ECC circuit 6223 may generate an ECC (Error Correction Code) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. The ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may exchange data with the host 6210 through the host interface 6224. The memory controller 6220 may transmit data to, or receive data from, the memory device 6230 through the NVM interface 6225. The host interface 6224 may be connected to the host 6210 through a PATA bus, SATA bus, SCSI, USB, PCIe or NAND interface. The memory controller 6220 may have a wireless communication function with a mobile communication protocol such as WiFi or Long Term Evolution (LTE). The memory controller 6220 may be connected to an external device, for example, the host 6210 or another external device, to exchange data with the external device. As the memory controller 6220 is configured to communicate with the external device through one or more of various communication protocols, the memory system and the data processing system in accordance with an embodiment may be applied to wired/wireless electronic devices, particularly a mobile electronic device.

Figure 9:
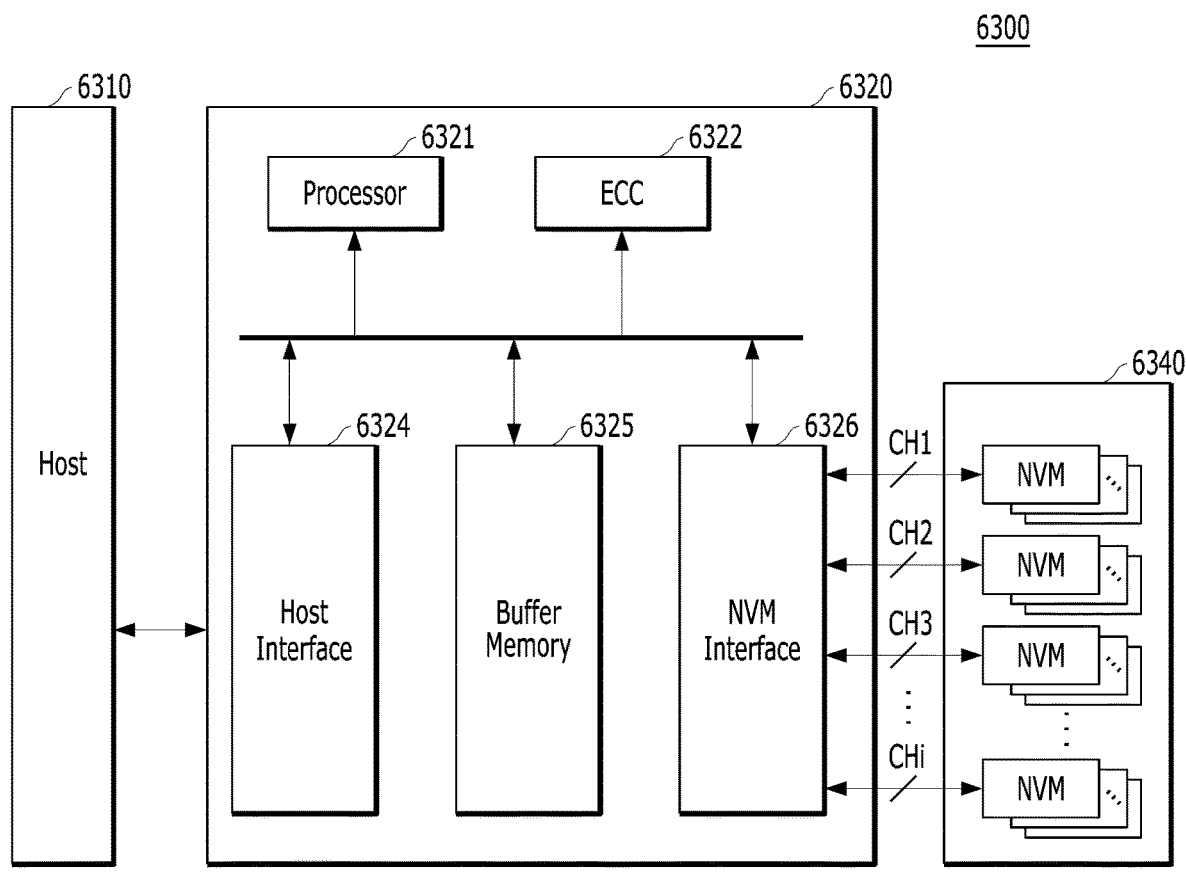

FIG. 9 is a diagram schematically illustrating another example of the data processing system including the memory system in accordance with an embodiment. FIG. 9 schematically illustrates an SSD to which the memory system may be applied.

Referring to FIG. 9, the SSD 6300 may include a controller 6320 and a memory device 6340 including a plurality of nonvolatile memories. The controller 6320 may correspond to the controller 130 in the memory system 110 of FIGS. 1 and 5. The memory device 6340 may correspond to the memory device 150 in the memory system of FIGS. 1 and 5.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM in the memory device 6340, or temporarily store meta data of the plurality of flash memories NVM, for example, map data including a mapping table. The buffer memory 6325 may be embodied by volatile memories such as DRAM, SDRAM, DDR SDRAM, LPDDR SDRAM and GRAM or nonvolatile memories such as FRAM, ReRAM, STT-MRAM and PRAM. By way of example, FIG. 8 illustrates that the buffer memory 6325 is embodied in the controller 6320. However, the buffer memory 6325 may be external to the controller 6320.

The ECC circuit 6322 may calculate an ECC value of data to be programmed to the memory device 6340 during a program operation. The ECC circuit 6322 may perform an error correction operation on data read from the memory device 6340 based on the ECC value during a read operation. The ECC circuit 6322 may perform an error correction operation on data recovered from the memory device 6340 during a failed data recovery operation.

The host interface 6324 may provide an interface function with an external device, for example, the host 6310. The nonvolatile memory interface 6326 may provide an interface function with the memory device 6340 connected through the plurality of channels.

Furthermore, a plurality of SSDs 6300 to which the memory system 110 of FIGS. 1 and 5 is applied may be provided to embody a data processing system, for example, RAID (Redundant Array of Independent Disks) system. The RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300. The RAID controller may output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300. The RAID controller may provide data read from the selected SSDs 6300 to the host 6310.

Figure 10:
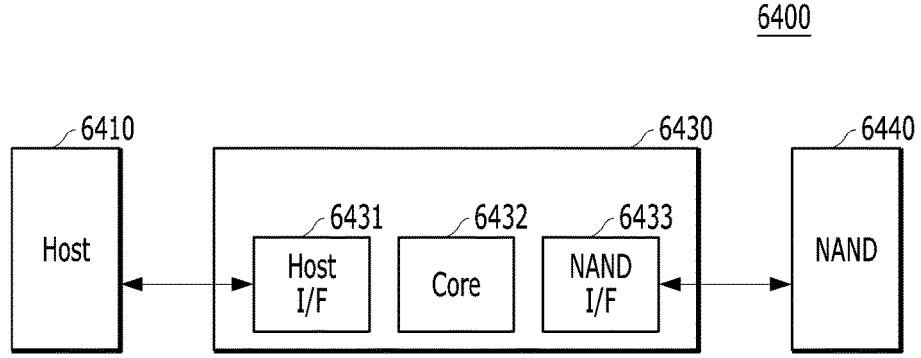

FIG. 10 is a diagram schematically illustrating another example of the data processing system including the memory system in accordance with an embodiment. FIG. 10 schematically illustrates an embedded Multi-Media Card (eMMC) to which the memory system may be applied.

Referring to FIG. 10, the eMMC 6400 may include a controller 6430 and a memory device 6440 embodied by one or more NAND flash memories. The controller 6430 may correspond to the controller 130 in the memory system 110 of FIGS. 1 and 5. The memory device 6440 may correspond to the memory device 150 in the memory system 110 of FIGS. 1 and 5.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400. The host interface 6431 may provide an interface function between the controller 6430 and the host 6410. The NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 11 to 14 are diagrams schematically illustrating other examples of the data processing system including the memory system in accordance with an embodiment. FIGS. 11 to 14 schematically illustrate UFS (Universal Flash Storage) systems to which the memory system may be applied.

Referring to FIGS. 11 to 14, the UFS systems 6500, 6600, 6700, 6800 may include hosts 6510, 6610, 6710, 6810, UFS devices 6520, 6620, 6720, 6820 and UFS cards 6530, 6630, 6730, 6830, respectively. The hosts 6510, 6610, 6710, 6810 may serve as application processors of wired/wireless electronic devices or particularly mobile electronic devices, the UFS devices 6520, 6620, 6720, 6820 may serve as embedded UFS devices, and the UFS cards 6530, 6630, 6730, 6830 may serve as external embedded UFS devices or removable UFS cards.

The hosts 6510, 6610, 6710, 6810, the UFS devices 6520, 6620, 6720, 6820 and the UFS cards 6530, 6630, 6730, 6830 in the respective UFS systems 6500, 6600, 6700, 6800 may communicate with external devices, for example, wired/wireless electronic devices, particularly mobile electronic devices through UFS protocols, and the UFS devices 6520, 6620, 6720, 6820 and the UFS cards 6530, 6630, 6730, 6830 may be embodied by the memory system 110 illustrated in FIGS. 1 and 5. For example, in the UFS systems 6500, 6600, 6700, 6800, the UFS devices 6520, 6620, 6720, 6820 may be embodied in the form of the data processing system 6200, the SSD 6300 or the eMMC 6400 described with reference to FIGS. 8 to 10, and the UFS cards 6530, 6630, 6730 and 6830 may be embodied in the form of the memory card system 6100 described with reference to FIG. 7.

Furthermore, in the UFS systems 6500, 6600, 6700, 6800, the hosts 6510, 6610, 6710, 6810, the UFS devices 6520, 6620, 6720 and 6820 and the UFS cards 6530, 6630, 6730, 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720, 6820 and the UFS cards 6530, 6630, 6730, 6830 may communicate with each other according to various protocols other than the UFS protocol, for example, UFDs, MMC, SD, mini-SD, and micro-SD.

Figure 11:
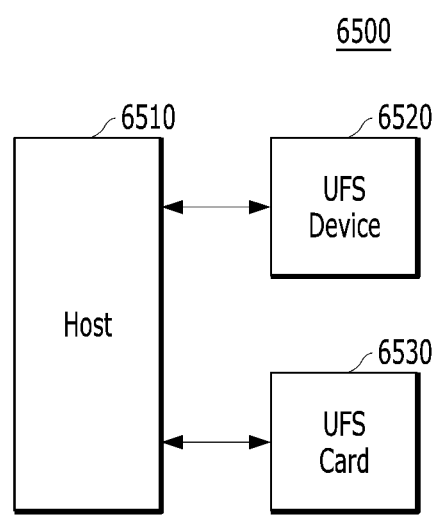

In the UFS system 6500 illustrated in FIG. 11, each of the host 6510, the UFS device 6520 and the UFS card 6530 may include UniPro. The host 6510 may perform a switching operation to communicate with the UFS device 6520 and the UFS card 6530. The host 6510 may communicate with the UFS device 6520 or the UFS card 6530 through link layer switching, for example, L3 switching at the UniPro. The UFS device 6520 and the UFS card 6530 may communicate with each other through link layer switching at the UniPro of the host 6510. In an embodiment, the configuration in which one UFS device 6520 and one UFS card 6530 are connected to the host 6510 has been illustrated for clarity. However, a plurality of UFS devices and UFS cards may be connected in parallel or in the form of a star to the host 6410. A plurality of UFS cards may be connected in parallel or in the form of a star to the UFS device 6520 or connected in series or in the form of a chain to the UFS device 6520.

Figure 12:
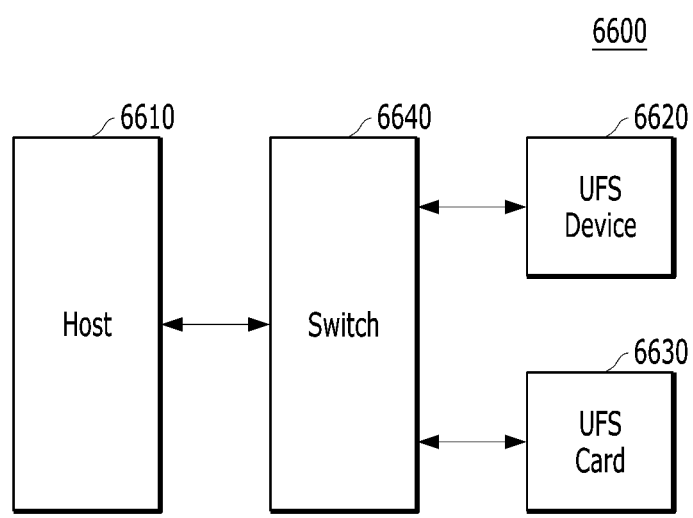

In the UFS system 6600 illustrated in FIG. 12, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In an embodiment, the configuration in which one UFS device 6620 and one UFS card 6630 are connected to the switching module 6640 has been illustrated for clarity. However, a plurality of UFS devices and UFS cards may be connected in parallel or in the form of a star to the switching module 6640. A plurality of UFS cards may be connected in series or in the form of a chain to the UFS device 6620.

Figure 13:
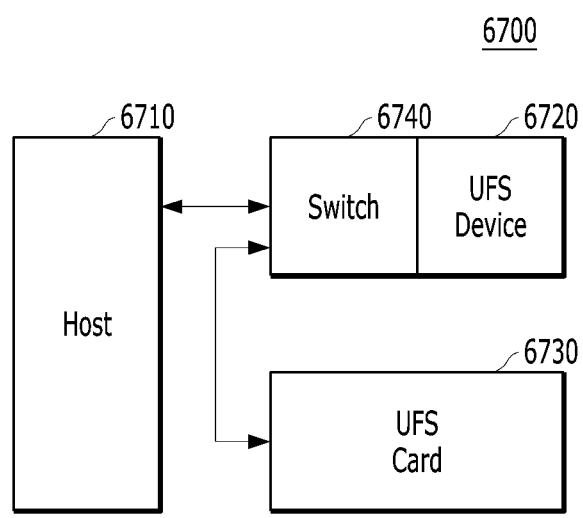

In the UFS system 6700 illustrated in FIG. 13, each of the host 6710, the UFS device 6720 and the UFS card 6730 may include UniPro. The host 6710 may communicate with the UFS device 6720 or the UFS card 6730 through a switching module 6740 performing a switching operation, for example, through the switching module 6740 which performs link layer switching at the UniPro, for example, L3 switching. The UFS device 6720 and the UFS card 6730 may communicate with each other through link layer switching of the switching module 6740 at the UniPro, and the switching module 6740 may be integrated as one module with the UFS device 6720 inside or outside the UFS device 6720. In an embodiment, the configuration in which one UFS device 6720 and one UFS card 6730 are connected to the switching module 6740 has been illustrated for clarity. However, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 14:
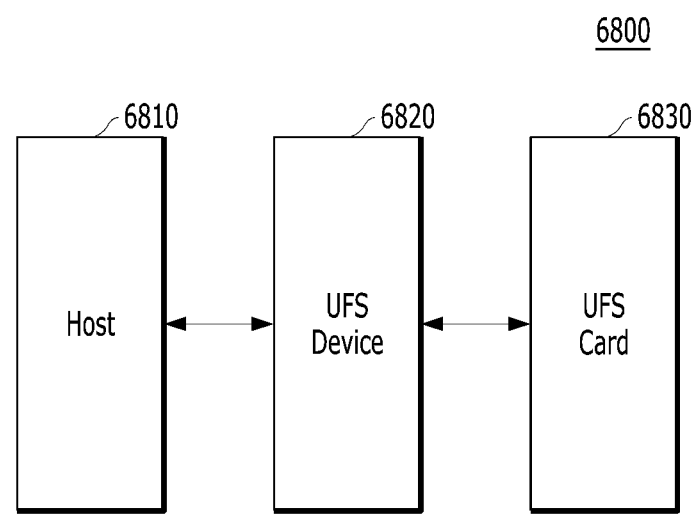

In the UFS system 6800 illustrated in FIG. 14, each of the host 6810, the UFS device 6820 and the UFS card 6830 may include M-PHY and UniPro. The UFS device 6820 may perform a switching operation to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, e.g., through a target ID (Identifier) switching operation. The host 6810 and the UFS card 6830 may communicate with each other through target ID switching between the M-PHY and UniPro modules of the UFS device 6820. In an embodiment, the configuration in which one UFS device 6820 is connected to the host 6810 and one UFS card 6830 is connected to the UFS device 6820 has been exemplified for convenience of description. However, a plurality of UFS devices may be connected in parallel or in the form of a star to the host 6810, or connected in series or in the form of a chain to the host 6810. A plurality of UFS cards may be connected in parallel or in the form of a star to the UFS device 6820, or connected in series or in the form of a chain to the UFS device 6820.

Figure 15:
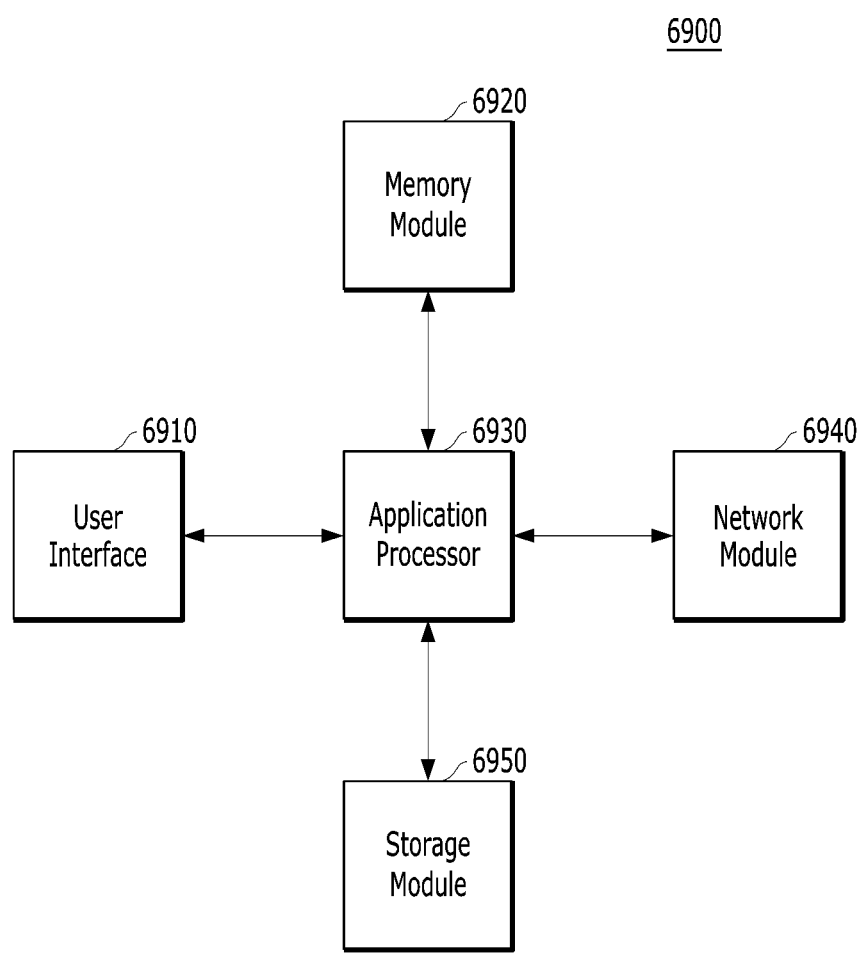

FIG. 15 is a diagram schematically illustrating another example of the data processing system including the memory system in accordance with an embodiment. FIG. 15 is a diagram schematically illustrating a user system to which the memory system may be applied.

Referring to FIG. 15, the user system 6900 may include an application processor 6930, a memory module 6920, a network module 6940, a storage module 6950 and a user interface 6910.

More specifically, the application processor 6930 may drive components included in the user system 6900, for example, an OS, and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile RAM such as DRAM, SDRAM, DDR SDRAM, DDR2 SDRAM, DDR3 SDRAM, LPDDR SDARM, LPDDR3 SDRAM or LPDDR3 SDRAM or a nonvolatile RAM such as PRAM, ReRAM, MRAM or FRAM. For example, the application processor 6930 and the memory module 6920 may be packaged and mounted, based on POP (Package on Package).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930. The storage module 6950 may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, a NOR flash and a 3D NAND flash, and provided as a removable storage medium such as a memory card or an external drive of the user system 6900. The storage module 6950 may correspond to the memory system 110 described with reference to FIGS. 1 and 5. Furthermore, the storage module 6950 may be embodied as an SSD, an eMMC and an UFS as described above with reference to FIGS. 9 to 14.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIGS. 1 and 5 is applied to a mobile electronic device of the user system 6900, the application processor 6930 may control overall operations of the mobile electronic device, and the network module 6940 may serve as a communication module for controlling wired/wireless communication with an external device. The user interface 6910 may display data processed by the processor 6930 on a display/touch module of the mobile electronic device. The user interface 6910 may support a function of receiving data from the touch panel.

In the present technology, boot data used in a host are stored and managed together with normal data in a normal area. A checkpoint operation for boot data is performed more frequently than a checkpoint operation for normal data.

Through this arrangement, boot data may be stored in the normal area while sufficiently securing reliability. Also, since it is not necessary to manage a separate storage area for storing boot data, it is possible to minimize a time required for the booting operation of the host.

Although various embodiments have been described for illustrative purposes, it will be apparent to those skilled in the art in light of the present disclosure that various changes and modifications may be made without departing from the spirit and scope of the invention as defined in the following claims.

What is claimed is:

1. A memory system comprising:
a control device;
a nonvolatile memory device including a first memory block and a second memory block; and
wherein the control device configured to:
receive data from a host device and then store the received data in the first memory block;
determine whether the received data is boot data or normal data;
perform a first checkpoint operation for storing metadata of the boot data in the second memory block, each time the boot data is stored in the first memory block, when the received data is the boot data; and
perform a second checkpoint operation for storing metadata of updated normal data in the second memory block, after the normal data stored in the first memory block is updated during a background operation, when the received data is normal data.

2. The memory system according to claim 1, wherein the control device includes a volatile memory device for temporarily storing the metadata of the received data after storing the received data in the first memory block.

3. The memory system according to claim 2, wherein the metadata stored in the volatile memory device is copied or moved to the second memory block during the first or second checkpoint operation.

4. The memory system according to claim 1, wherein the background operation includes at least one of a garbage collection operation, a wear leveling operation, a bad block management operation and a read reclaim operation.

5. The memory system according to claim 1, wherein the control device performs the first checkpoint operation, each time an amount of the boot data stored in the first memory block exceeds a predetermined value.

6. The memory system according to claim 1, wherein the control device performs a recovery operation, in response to the memory device being powered on after a sudden power-off (SPO) occurs, based on searching data stored in the first memory device after the first or second checkpoint operation performed most recently.

7. The memory system according to claim 6, wherein the control device searches data by a unit of page stored in the first memory block.

8. The memory system according to claim 6, wherein the recovery operation performs for only the normal data searched, by referring to the metadata stored in the second memory block.

9. A method for operating a memory system including a control device and a nonvolatile memory device including a first memory block and a second memory block, the method comprising:

storing, by the control device, data received from a host device in the first memory block;
determining, by the control device, whether the received data is a boot data or a normal data;
performing, by the control device, a first checkpoint operation for storing metadata of the boot data in the second memory block, each time the boot data is stored in the first memory block, when the received data is boot data; and
performing, by the control device, a second checkpoint operation for storing metadata of updated normal data in the second memory block, after the normal data stored in the first memory block is updated during a background operation, when the received data is normal data.

10. The method according to claim 9, further comprising:
temporarily storing, by the control device, the metadata of the received data in a volatile memory device included in the control device after storing the received data in the first memory block.

11. The method according to claim 10, wherein the performing the first or second checkpoint operation comprise copying or moving the metadata stored in the volatile memory device to the second memory block.

12. The method according to claim 9, wherein the background operation includes at least one of a garbage collection operation, a wear leveling operation, a bad block management operation and a read reclaim operation.

13. The method according to claim 9, wherein the performing the first checkpoint operation each time an amount of the boot data stored in the first memory block exceeds a predetermined value.

14. The method according to claim 9, further comprising:
performing, by the control device, a recovery operation, in response to the memory device being powered on after a sudden power-off (SPO) occurs, based on searching data stored in the first memory device after the first or second checkpoint operation performed most recently.

15. The method according to claim 14, wherein the searching comprises data is searched by a unit of page stored in the first memory block.

16. The method according to claim 14, wherein the performing the recovery operation comprises selectively performing the operation for only the normal data searched, by referring to the metadata stored in the second memory block.

* * * * *